(12) United States Patent
Lindsay et al.

(10) Patent No.: US 6,176,783 B1
(45) Date of Patent: Jan. 23, 2001

(54) ROTARY DRAG DEVICES

(75) Inventors: Richard Arthur Lindsay, Eye; Robin Andrew Sayer, Bury St. Edmunds, both of (GB)

(73) Assignee: Vitec Group, PLC, Suffolk (GB)

( * ) Notice: Under 35 U.S.C. 154(b), the term of this patent shall be extended for 0 days.

(21) Appl. No.: 09/043,391

(22) PCT Filed: Sep. 20, 1996

(86) PCT No.: PCT/GB96/02342

§ 371 Date: Jun. 18, 1998

§ 102(e) Date: Jun. 18, 1998

(87) PCT Pub. No.: WO97/11308

PCT Pub. Date: Mar. 27, 1997

(30) Foreign Application Priority Data

Sep. 20, 1995 (GB) .................................. 9519200

(51) Int. Cl.[7] .............................. F16D 57/00; F16D 31/10
(52) U.S. Cl. .............................. 464/24; 464/30; 188/290; 192/58.41
(58) Field of Search ............................ 464/24, 36, 901; 192/58.41, 58.42; 188/296, 293, 290

(56) References Cited

U.S. PATENT DOCUMENTS

| | | | |
|---|---|---|---|
| 3,119,469 | * | 1/1964 | Farr et al. ........................ 192/58.41 |
| 3,791,498 | * | 2/1974 | Wassermann ........................ 188/290 |
| 4,488,626 | * | 12/1984 | Handke ................................ 188/290 |
| 4,770,651 | * | 9/1988 | Friedrich ............................. 464/24 |
| 4,919,006 | * | 4/1990 | Willett et al. ...................... 192/58.41 |
| 4,955,568 | | 9/1990 | O'Connor et al. . |
| 4,982,808 | * | 1/1991 | Taureg et al. ..................... 192/58.41 |
| 5,005,685 | * | 4/1991 | Takano et al. .................... 192/58.41 |
| 5,007,515 | * | 4/1991 | Shimizu ............................. 192/58.41 |
| 5,165,506 | * | 11/1992 | Guimbretiere ...................... 188/290 |
| 5,232,075 | * | 8/1993 | Mohan .................................. 192/58 |
| 5,310,382 | * | 5/1994 | Guimbretiere ......................... 464/24 |
| 5,881,849 | * | 3/1999 | Gassmann ......................... 192/58.41 |

* cited by examiner

Primary Examiner—Lynne H. Browne
Assistant Examiner—Kenneth Thompson
(74) Attorney, Agent, or Firm—Kenyon & Kenyon (57) ABSTRACT

The disclosure relates to a rotary drag device having relatively rotatable members one (4) of which has a stack (5) of closely spaced, thin-walled flexible annular plates (20) peripherally mounted thereon to provide annular running faces and a viscous fluid filling the spaces between the plates, and the other (6) of which members has a stack (8) of segmental plates (33) having part-annular running faces interleaved with the annular plates to slide between the plates with relative rotation of the members. Slits (26, 27) in the annular plates permit release of viscous fluid from between the plates as fluid pressure rises ahead of the segmental plates with increasing relative speed between the members. The flexibility of the annular plates allowing the plates to close together accommodating the loss of viscous fluid from between the plates whereby the damping characteristic of the device can vary between viscous drag between the relative running surfaces of the annular and segmental plates at low relative speeds of the members and, with loss of viscous fluid from between the plates, can change to boundary lubrication between the running surfaces of the respective plates at higher relative speeds of rotation of the members.

17 Claims, 14 Drawing Sheets

ROTARY DRAG DEVICES

This invention relates to a rotary drag device for providing a coupling having a selected speed/torque characteristic between two relatively rotatable members. The invention is particularly applicable to TV/video camera mountings such as pan and tilt heads.

Devices which produce drag or damping by means of either friction or viscous shear between relatively moving elements are well known. The former typically comprise a friction clutch attached to one element and contacting a relatively moving element under pressure such that energy is dissipated by the resulting sliding contact. The magnitude of the damping force is dependent upon the friction contact pressure and is therefore readily varied.

The torque/speed characteristic of a friction damper may be modified by the choice of friction materials and/or the provision of a fluid at the friction surface to provide boundary lubrication of the sliding contact in which case the damping force may rise with increasing speed from a stationary position to an initial level and thereafter remain substantially constant irrespective of speed.

Viscous dampers typically comprise multiple interleaved plates alternately attached to each of the relatively moving elements, each plate being separated from adjacent plates by a small gap occupied by a viscous fluid. Relative movement of the plates causes viscous shear to take place in the fluid. The damping force generated tends to increase substantially linearly with speed but at rest is zero.

A particularly important application of a drag/damper device is in pan and tilt heads for cameras, especially television cameras. In this application it is advantageous, to avoid "jerking" when making very slow camera movements from rest, for the torque to be substantially zero at near zero speed. On the other hand, for increasingly fast camera movements above a certain speed, it is advantageous for the resistance torque not to rise in proportion necessitating application of an increasing force to move the camera.

U.S. Pat. No. 4,955,568 discloses a camera mounting pan and lift head, including fluid drag systems or resisting pan and tilt movement and a counterbalance system in supporting the camera in equilibrium in any position in its range of tilt movement. The fluid drag systems each include a drag disc assembly secured to the rotating shaft and drag section assemblies pivotally mounted on the housing and disposed about the circumference of the disc assembly to define the space containing discus fluid. The level of drag exerted may be adjusted by pivoting the sector assemblies towards or away from the disc assembly to vary the space containing viscous fluid. In this system is the drag provided will rise more or less linearly with relative rotational speed of the components of the drag system so that at very high speed, there is high drag force.

In applications such as a camera mounting, where the purpose of the damping device is to enhance the smoothness and control of manual movements, the following characteristics are therefore desirable:

1. The rate of change of the damping/speed relationship should tend to zero at high speed to permit relatively fast movements to be accomplished without unreasonable restraint, whilst providing adequate damping control at low speeds.
2. For fine control at the commencement of movement and during reversals, the unit should produce zero damping at rest and a high rate of change of damping with speed at low speed.

Our UK Patent Application number 9018312.0 describes and illustrates a rotary damper comprising two torque resisting rotary damping devices coupled together in series, one of said rotary damping devices having an input, an output and a viscous fluid coupling to provide a resistance torque to relative rotation between the input and output which is zero when the relative speed between the input and output is zero and which rises generally linearly with relative speed between the input and output. The other of the rotary damping devices has an input and an output and a torque resistant friction coupling which resists relative rotation between the input and output up to a certain torque and above which the friction coupling allows slippage with a substantially constant torque resistance. Thus the two rotary damping devices together provide a combined speed/torque characteristic in which the resistance torque generated by the viscous coupling rises with speed to a certain level at which the torque causes the friction coupling to slip whereafter the resistance offered by the damper remains substantially constant for higher speeds.

Providing separate friction and viscous couplings in series does however result in a complicated arrangement which is difficult to pack into a restricted space. The space available for drag devices in a camera mounting is normally limited and it is highly desirable therefore to make the drag devices as compact as possible.

This invention provides a rotary drag device having relatively rotatable members one of which has a plurality of closely spaced, thin-walled flexible annular plates peripherally mounted thereon to provide annular running faces and a viscous fluid filling the spaces between the plates, and the other of which members has a plurality of segmental elements having part-annular running faces interleaved with the annular plates to slide between the plates with relative rotation of the members and means to permit release of viscous fluid from between the plates as fluid pressure rises ahead of the segmental plates with increasing relative speeds between the members, the flexibility of the annular plates allowing the plates to close together accommodating the loss of viscous fluid from between the plates whereby the damping characteristic of the device can vary between viscous drag between the relative running surfaces of the annular and segmental plates at low relative speeds of the members and, with loss of viscous fluid from between the plates, can change to boundary lubrication between the running surfaces of the respective plates at higher relative speeds of rotation of the members.

In one arrangement according to the invention the means to permit release of viscous fluid between the plates includes apertures in the annular plates outside the running surfaces thereof for the viscous fluid to flow axially between the plates.

More specifically the apertures may comprise elongate arcuate slits spaced around the annular plates outside the running surfaces thereof.

In one particular arrangement according to the invention the elongate arcuate slits may comprise inner and outer sets of arcuate slits staggered with respect to each other to provide flexible beam elements between the respective ends of the inner and outer slits to allow the running surface part of the annular plate to move axially with respect to the peripheral mounting of the plate whereby the spacing between the running surfaces of the annular plates can vary with the amounts of viscous fluids between the plates.

In any of the arrangements referred to above the segmental elements may have means to permit limited axial movement of the running faces of the elements to accommodate axial movement of the running faces of the annular plates.

For example, the means in the segmental plates to permit axial movement of the running faces thereof may comprise inner and outer rows of annular slits, outside the running faces of the plates with the slits in the outer set staggered with respect to the slits in the inner set to provide beam elements between the respective ends of the slits which can flex to allow limited axial movement of the running faces of the segmental elements with respective to their respective mountings.

In any of the above arrangements the annular plates may be mounted on said one member of the device around their outer peripheral edges and the segmental elements are mounted on said other member within the annular plates.

Also in any of the above arrangements means are provided for adjusting the overlap between the running faces of the segmental elements and the annular plates to vary the degree of drag provided.

More specifically the segmental elements may be mounted in pairs to engage between respective pairs of annular plates.

In the case where means are provided for adjusting the overlap between the running faces of the segmental and annular plates to vary the degree of drag provided the adjusting means may comprise meas for varying the spacing of the segmental plates in each pair.

More specifically said other member of the drag device may comprise a hub having a central axis co-axial with the axis of the annular plates and a pair of segmental plate carriers slidably mounted on the hub for movement towards and away from the central axis, said pairs of segmental plates being mounted on the outer sides of the plate carriers and a drive mechanism being provided for adjusting the spacing of the carriers and thereby the degree of overlap of the running surfaces of the segmental plates and the annular plates.

In one specific arrangement according to the invention the mechanism for adjusting the spacing of the mounting members comprises parallel elongate toothed rack members extending from the respective plate carriers across the hub and a rotatable pinion drive engaging the racks to adjust their respective positions.

The elongate toothed rack members may be in sliding engagement with one another and means may be provided for taking out any play or backlash between the members.

In the latter arrangement the anti-backlash means may comprise a spring loaded clamping arrangement acting between the hub and one of the racks members for holding the rack members together through the hub.

The following is a description of some specific embodiments of the invention, reference being made to the accompanying drawings in which.

Figure 1:
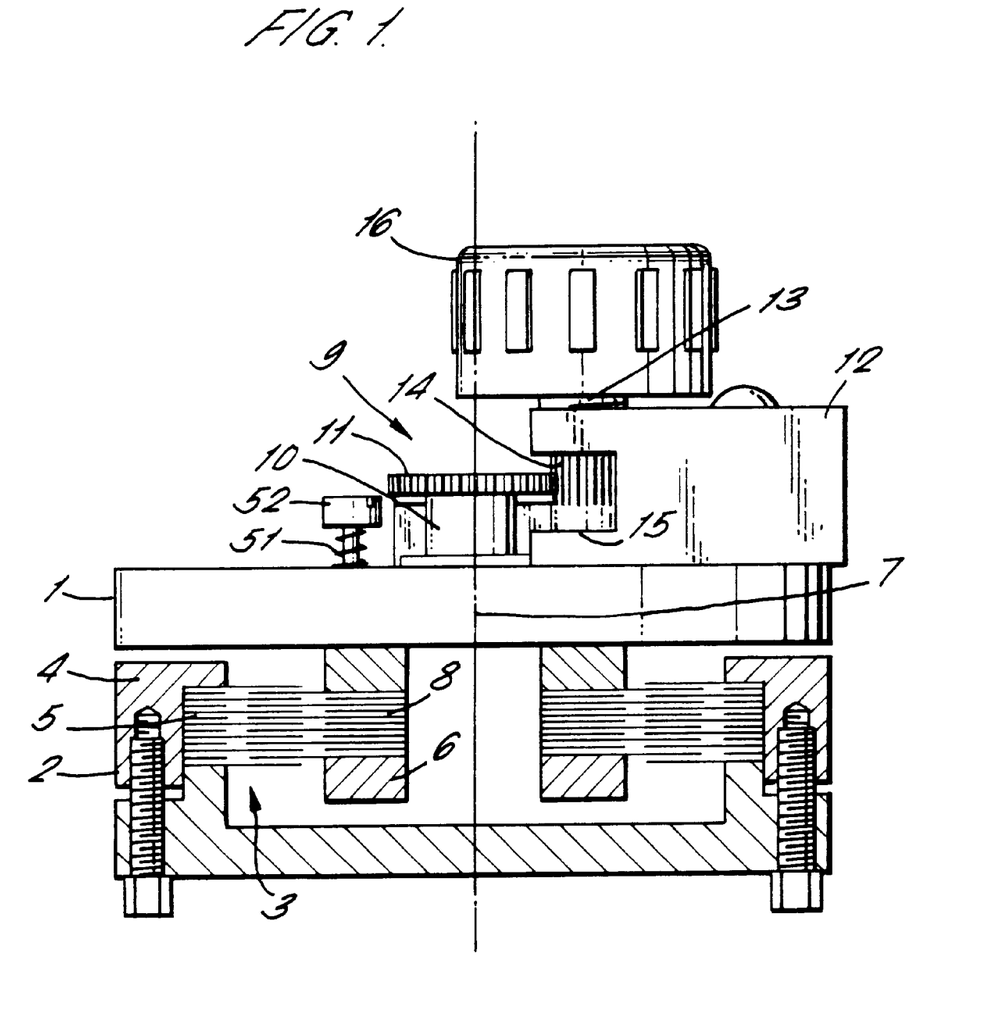
FIG. 1 is a plan view of a rotary viscous drag device controlling pan/tilt movement of a TV/video camera mounting including an outer housing in which the viscous coupling arrangement is enclosed and a control mechanism for varying the degree of resistance provided by the device.

Referring firstly to FIG. 1 of the drawings, there is shown a rotary drag device intended, in particular, for use on a TV/video camera mounting. Two such devices are provided on the camera mounting for damping pan and tilt movements of the mounting respectively. The device illustrated is particularly suitable for controlling tilt movement.

The device comprises a circular base plate 1 to one side of which there is an enclosed circular housing 2 containing a viscous fluid coupling 3 including a stator 4 consisting of a stack 5 of spaced annular plates mounted in the housing and a rotor 6 rotatably mounted about an axis 7 on the base plate. The rotor carries a stack 8 of spaced pairs of segmental plates located within the stator with the pairs of plates interleaved between the annular plates of the stator as will be described in detail later.

Figure 2:
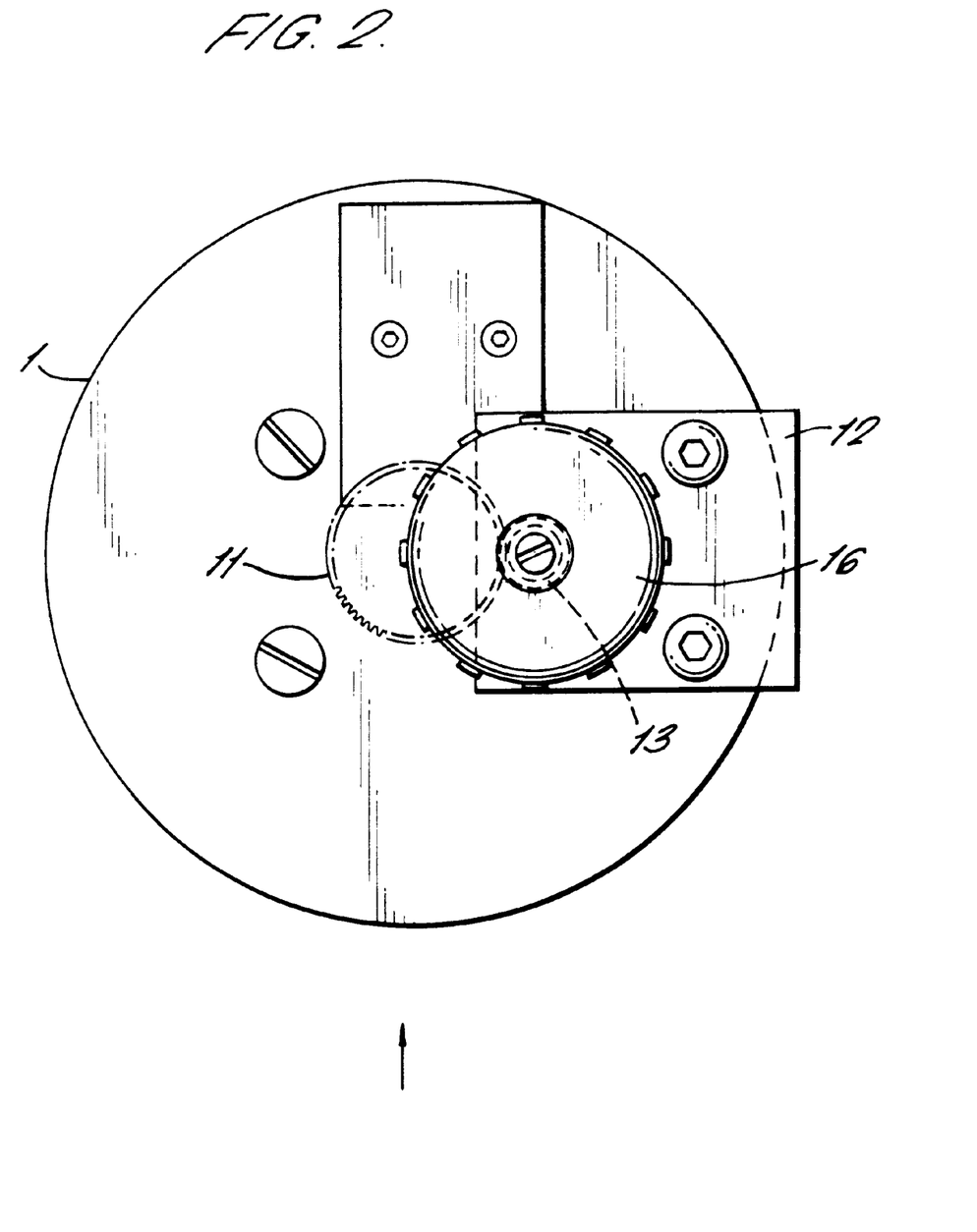
FIG. 2 is a front elevation view of the device showing the circular housing and rotary control knob for varying the coupling resistance.
Figure 3:
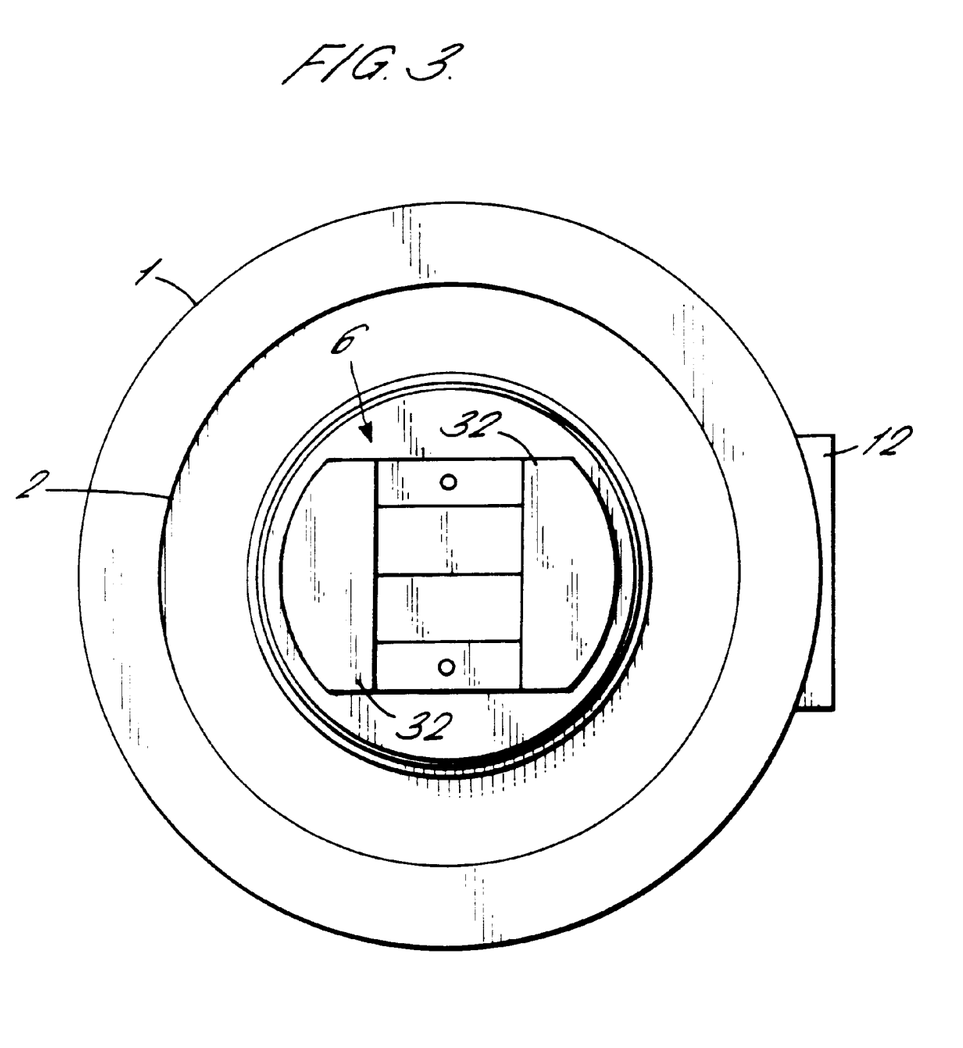
FIG. 3 is a rear elevation view of the device.

The spacing of the pairs of segmental plates can be adjusted to vary the degree of overlap of the plates with the annular plates and thereby vary the viscous drag provided by the coupling. A mechanism 9 for varying the spacing of the plates is located on the opposite side of the base plate to the viscous coupling. The mechanism comprises a central shaft mounted on the base plate in a fixed hub 10 and carrying a drive pinion 11. To one side of the hub there is a sub-housing 12 which is bolted to the housing 11. A shaft 13 is mounted in the housing with a pinion 14 fixed to the shaft within the housing supported in a block attached to the base plate. The housing has a side slot 15 through which pinion 11 projects to engage pinion 14. One end of shaft 13 projects from the sub-housing block and a control knob 16 is mounted on the projecting end of the shaft. The manner in which rotation of the shaft adjusts the segmental plates will be described below.

Figure 4:
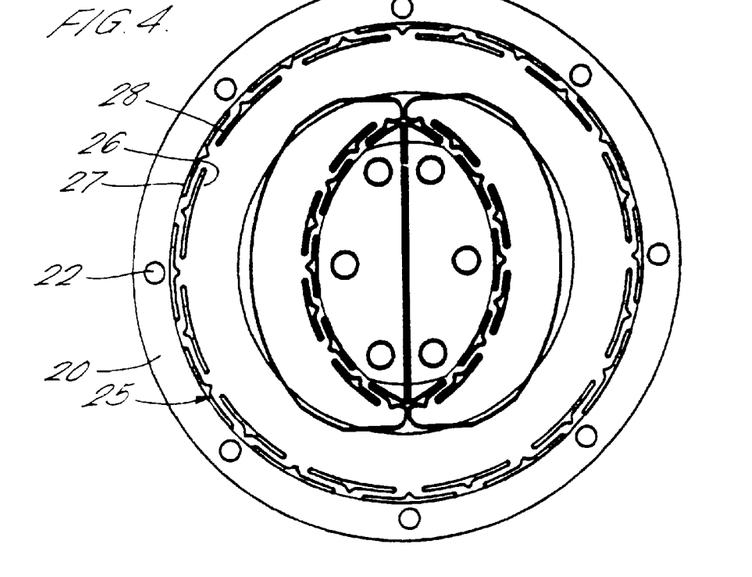
FIG. 4 is an elevation view of the components providing the viscous coupling of the drag device comprising a stack of annular plates for the stator of the coupling and a stack of pairs of segmental plates for the rotor with segmental plates shown in the minimum resistance positions.
Figure 5:
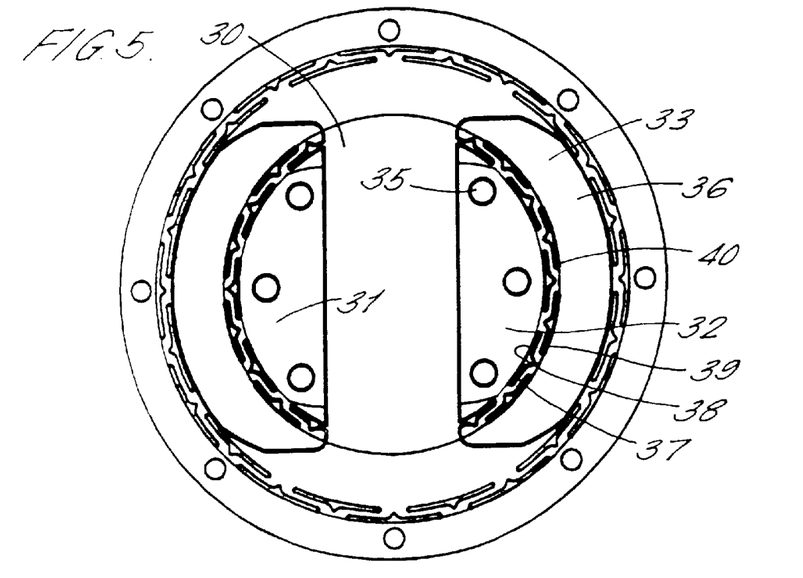
FIG. 5 is a similar view to that of FIG. 4 showing the segmental plates in their maximum resistance positions.
Figure 6:
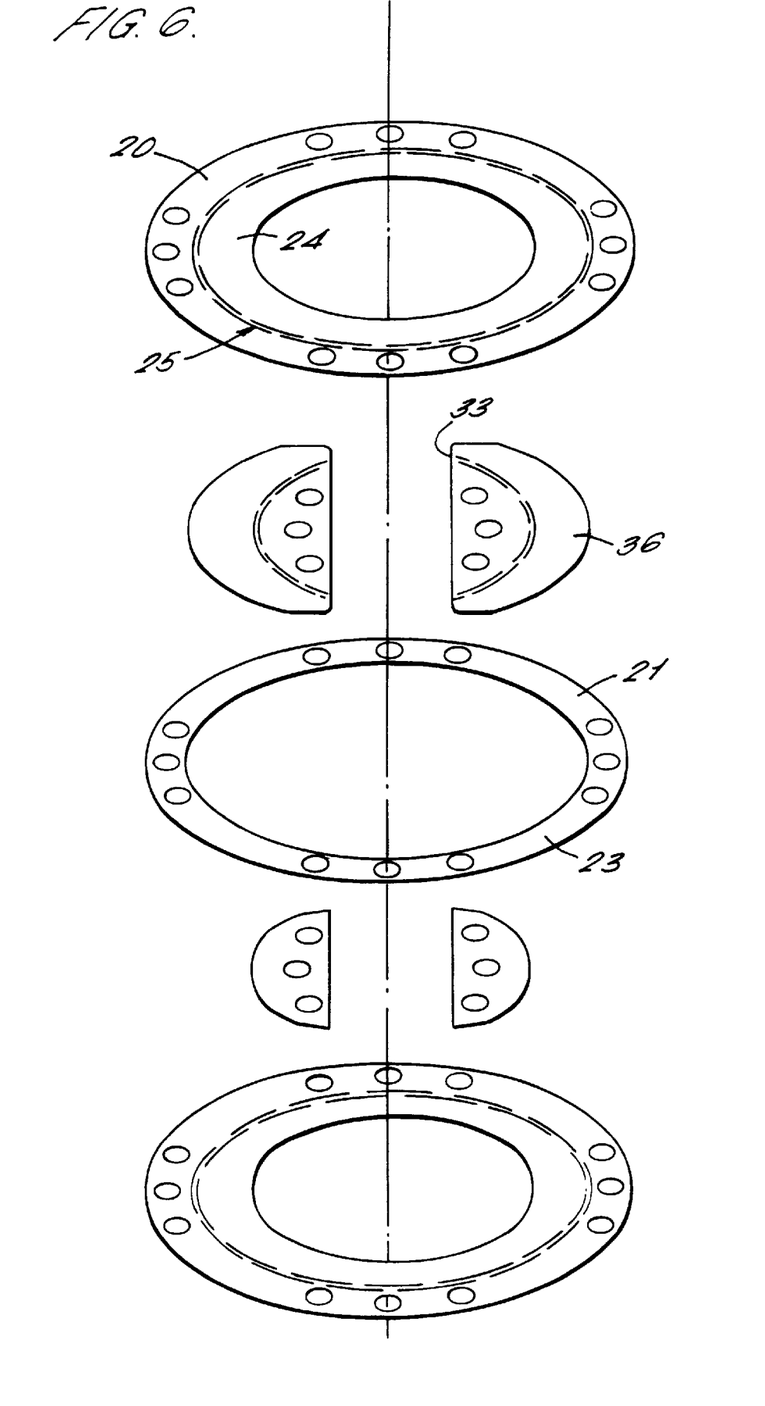
FIG. 6 is a perspective view of part of the stack of outer and inner plates and inner pairs of segmental plates forming the viscous coupling.
Figure 7:
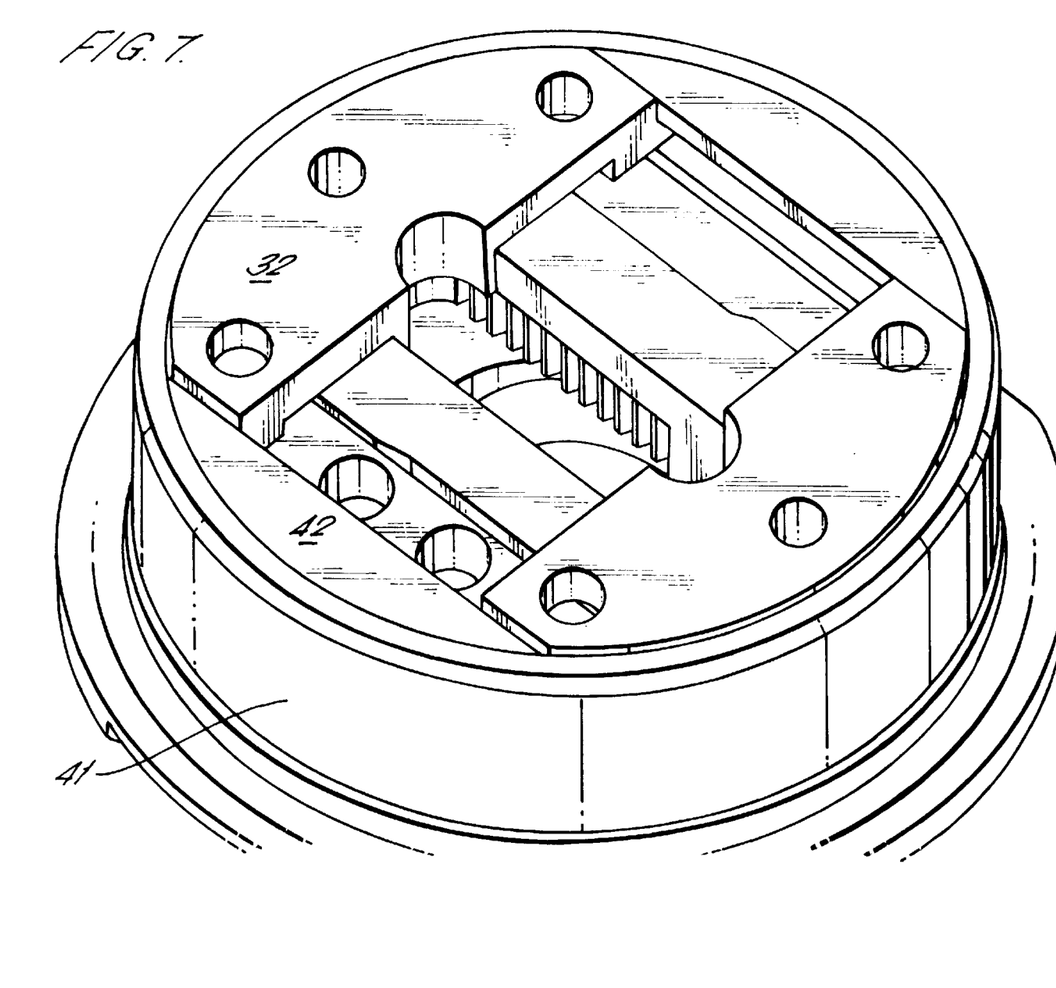
FIG. 7 is a perspective view of the mounting mechanism for the inner segmental plate for adjusting the separation of the plates and including an outer hub containing a chassis and plate carriers slidably mounted on the chassis.
Figure 8:
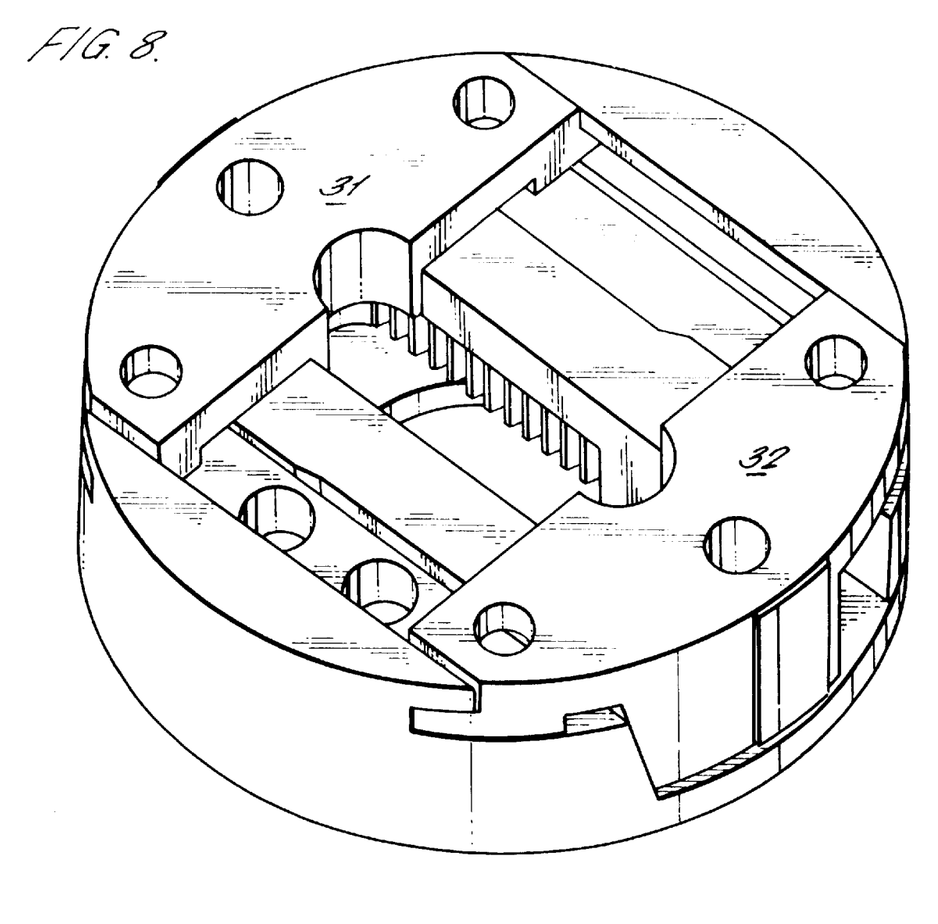
FIG. 8 is a similar view to that of FIG. 7 with the chassis removed from the hub.
Figure 9:
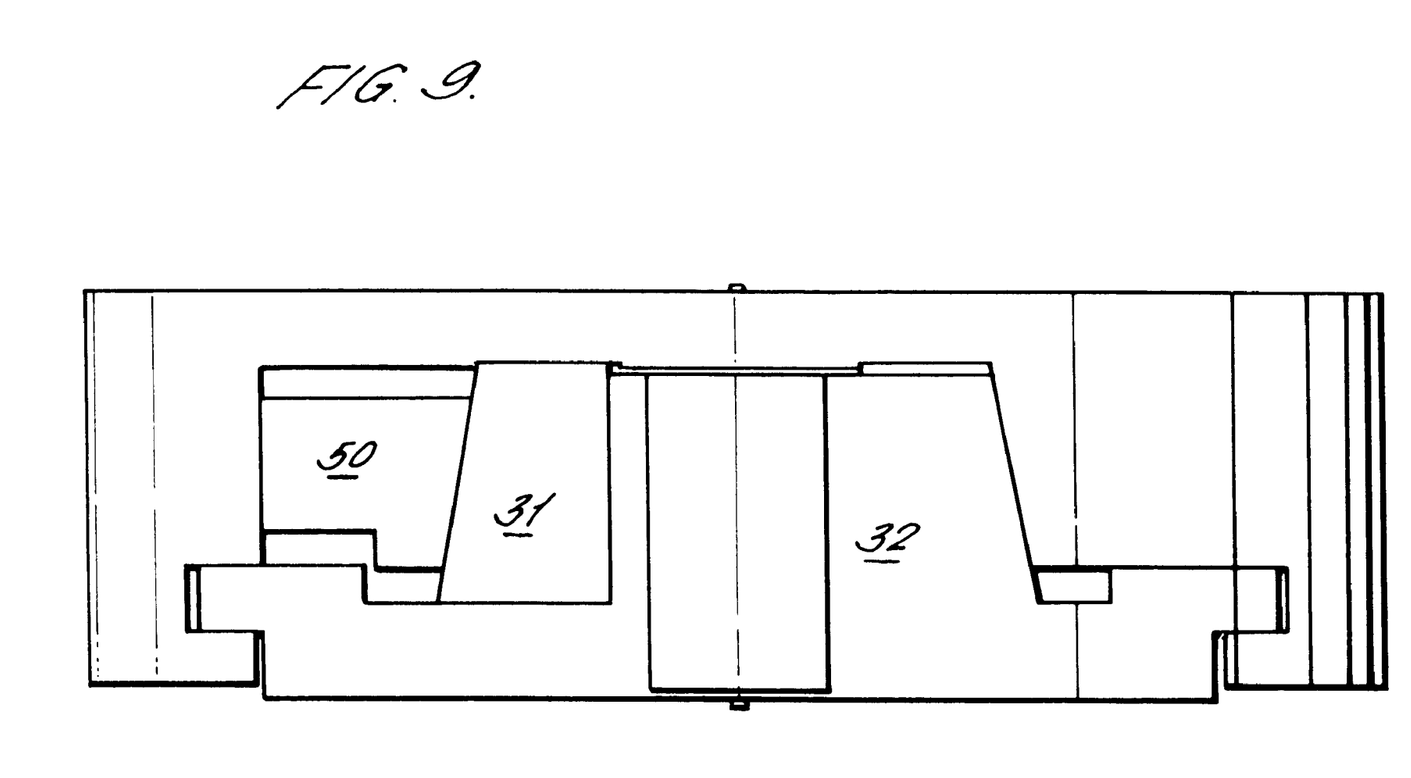
FIG. 9 is a side view of the chassis as shown in FIG. 8.

Reference is now made to FIGS. 4 to 6 of the drawings which show the rotary viscous coupling of the drag device in greater detail. The stator of the coupling comprises a stack of thin walled annular flexible metal plates 20 spaced apart at their outer peripheries by narrow annular spacer plates 21. Plates 20 have bolt holes 22 and the plates 21 have corresponding bolt holes 23 to receive through bolts (not shown) which secure the stack of plates together and secure the stack in the housing.

Each annular plate 20 has inner annular running faces 24 on either side of the plate and beyond the running faces 24 the plate has an annular band 25 in which a series of inner and outer arcuate slits 26, 27 are formed in the plate. The inner set of slits 26 is staggered symmetrically with respect to the outer set of slips to form arcuate beams 28 between the ends of the adjacent inner and outer slits. The beams 28 can flex to allow the inner annular portion of the plate carrying the running faces 24 to flex axially with respect to the outer periphery of the plate where it is mounted. The purpose of the flexing of the plate will be described below.

The rotor of the coupling 30 and comprises a pair of segmental plate carriers 31, 32 each of which carries a stack of thin walled flexible segmental plates 33 which are spaced apart by narrow spacer plates 34. The segmental plates and spacers are secured to the carriers by bolts, the holes for which are illustrated at 35.

The segmental plates 33 are interleaved between the annular plates 20 of the stator and have outer annular running faces 36 to engage with the running faces 24 of the annular plates.

The segmental plates each have a part annular band 37 between the running faces 36 and the plate mounting in which rows of inner and outer slits 38, 39 are formed. The inner slits are staggered symmetrically with respect of the outer slits to form equal length annular beams 40 between the respective ends of the slits. The arrangement enables the outer portion of each plate to flex axially with respect to its mounting in a similar manner to the way in which the annular plates flex as described above.

The housing 2 is filled with a viscous fluid to penetrate the spaces between the annular plates 20 and to provide a film of fluid between the adjacent running surfaces of the segmental plates 33 and annular plates 20 as the rotor turns in the stator. The viscous drag provided will be determined by the degree of overlap of segmental plates with the annular plates and this varies between the minimum plate engagement position shown in FIG. 4 in which just the tips of the segmental plates overlap and the maximum plate engagement position shown in FIG. 5 in which the full running faces of the segmental plates engage with those of the annular plates. The segmental plates may be tapered in cross-section towards their outer edges to facilitate penetration between the annular plates as the plates are moved between the minimum and maximum penetration positions.

It will be understood that as the rotor rotates within the stator pressure will be generated in the viscous fluid between the annular plates 20 ahead of the segmental plates with a corresponding drop in pressure behind the segmental plates. The rise in pressure ahead of the plates will tend to force fluid through the slits 26, 27 towards the ends of the stack where there are cavities between the stack and side walls of the housing 2. The drop in pressure behind the trailing ends of the segmental plates causes the plates to be drawn together which is permitted by the flexible bands 25 in the annular plates and similar flexible bands 37 in the segmental plates referred to above. As the speed of the rotor rises, so more and more viscous fluid is ejected from between the plates until the viscous fluid provides only a boundary lubrication between the running surfaces of the segmental and annular plates. At that stage, the drag characteristic provided by the coupling changes from a linear characteristic in which drag rises proportionally with speed when there is a full viscous layer between the working surfaces of the segmental and annular plates to a constant drag with only boundary lubrication between the running faces of the plates.

Figure 10:
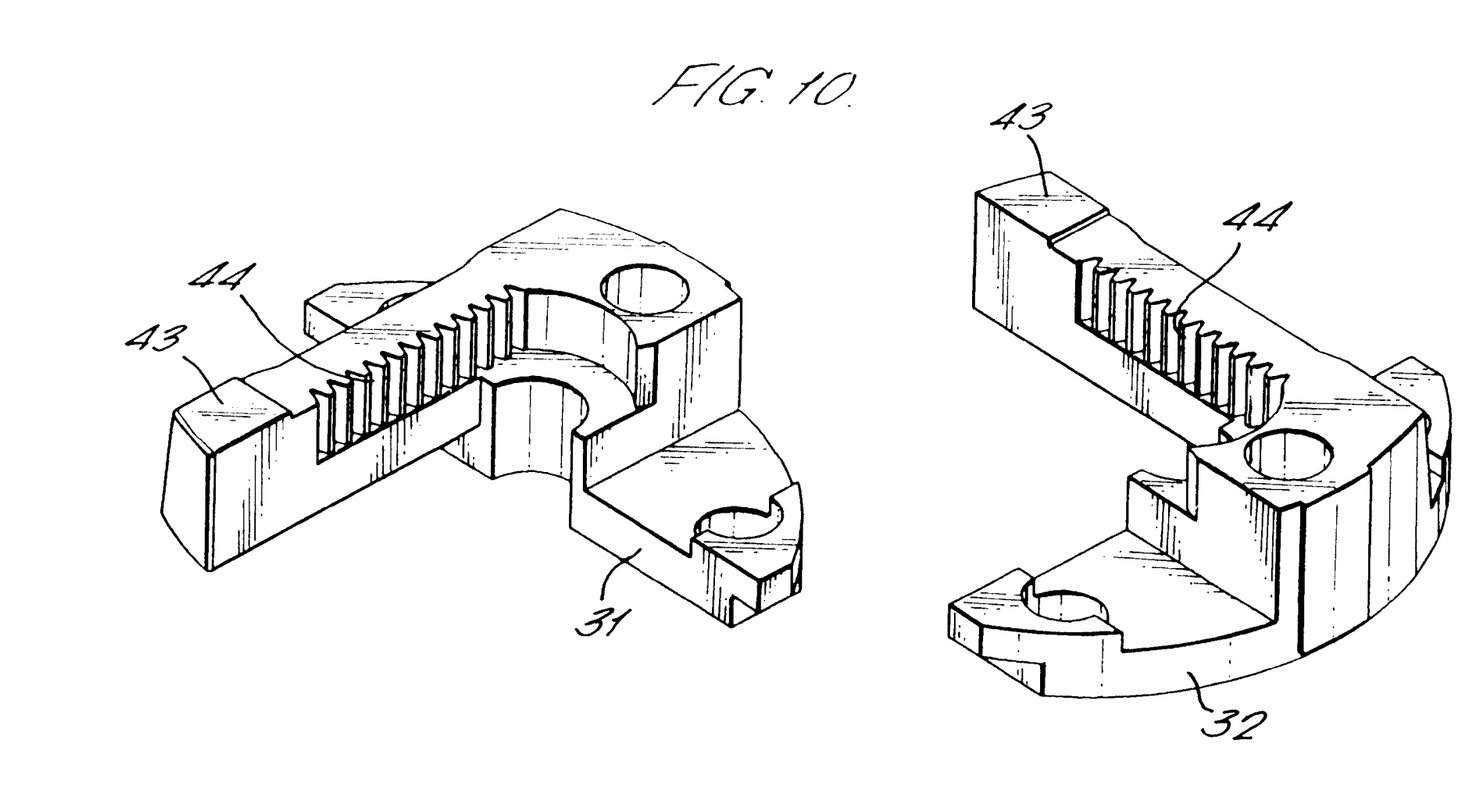
FIG. 10 is a perspective view of the pair of plate carriers removed from the chassis.
Figure 11:
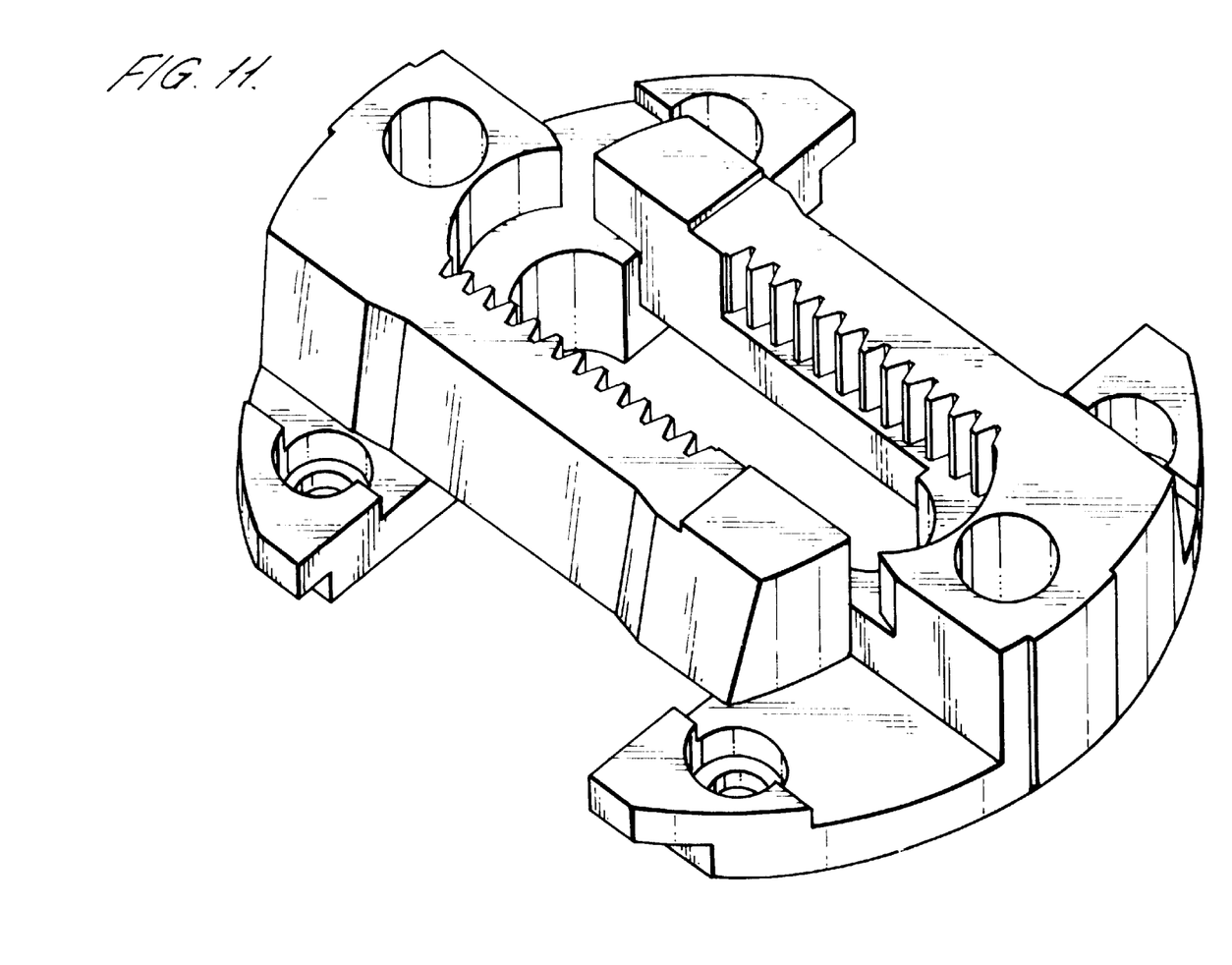
FIG. 11 is a perspective view of the pair of plate carriers in the position of maximum separation.

The mounting mechanism embodied in the rotor of the coupling for adjusting the spacing of the pairs of segmental plates will now be described with reference to FIGS. 9 to 13. The mechanism comprises an outer hub having an annular wall 41 within which a generally cylindrical chassis 42 is mounted. The plate carriers 31, 32 are slidably mounted in the chassis for movement towards and away from each other and as best seen in FIG. 10, each plate carrier has an elongate leg extending from the back of the carrier across the hub in sliding engagement with the other carrier. The adjacent faces of the legs are formed with toothed racks disposed opposite one another which engage a common pinion on the shaft 13.

Figure 12:
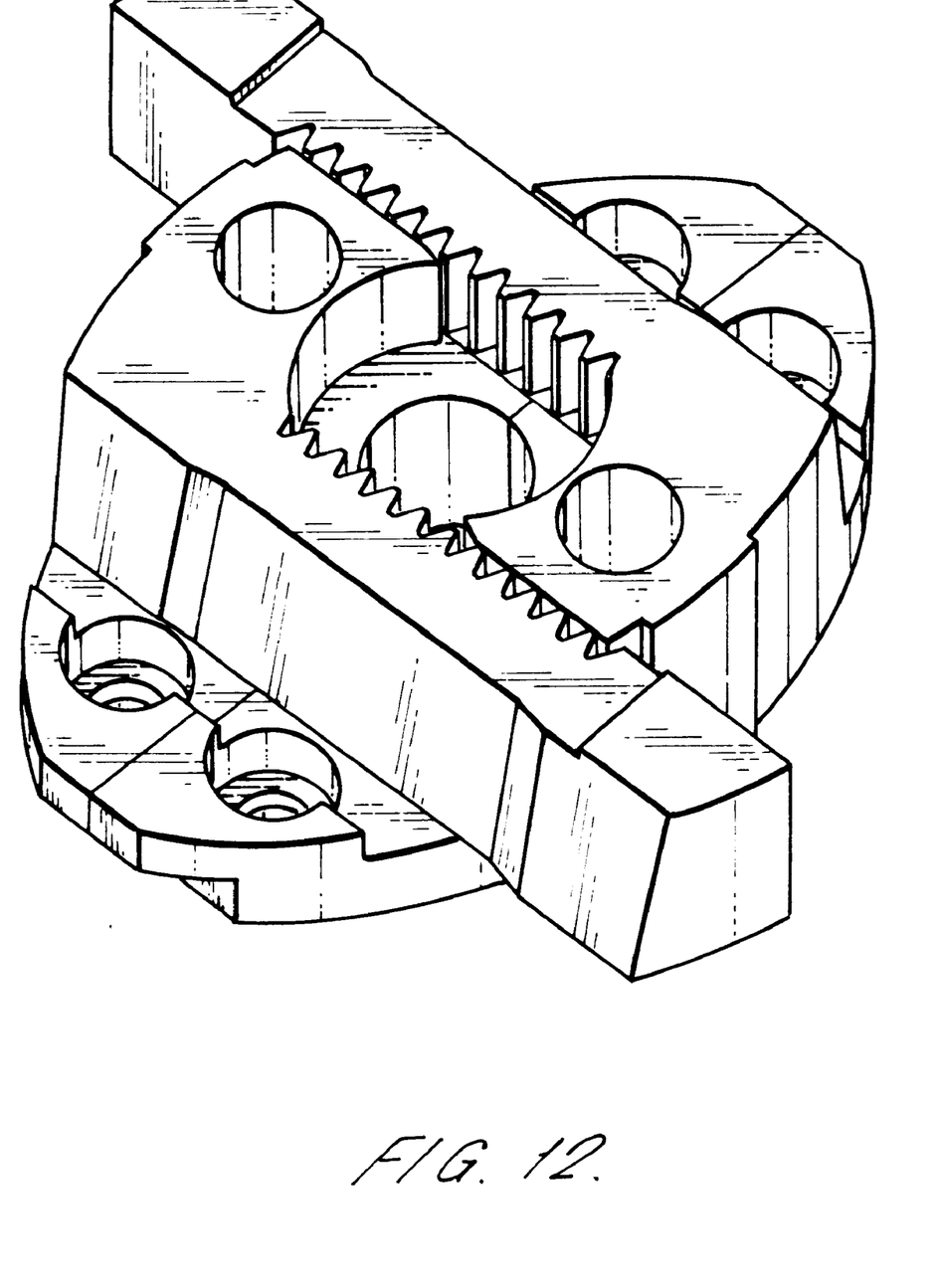
FIG. 12 is a similar view to that of FIG. 11 with the plate carriers in their position of minimum separation.
Figure 13:
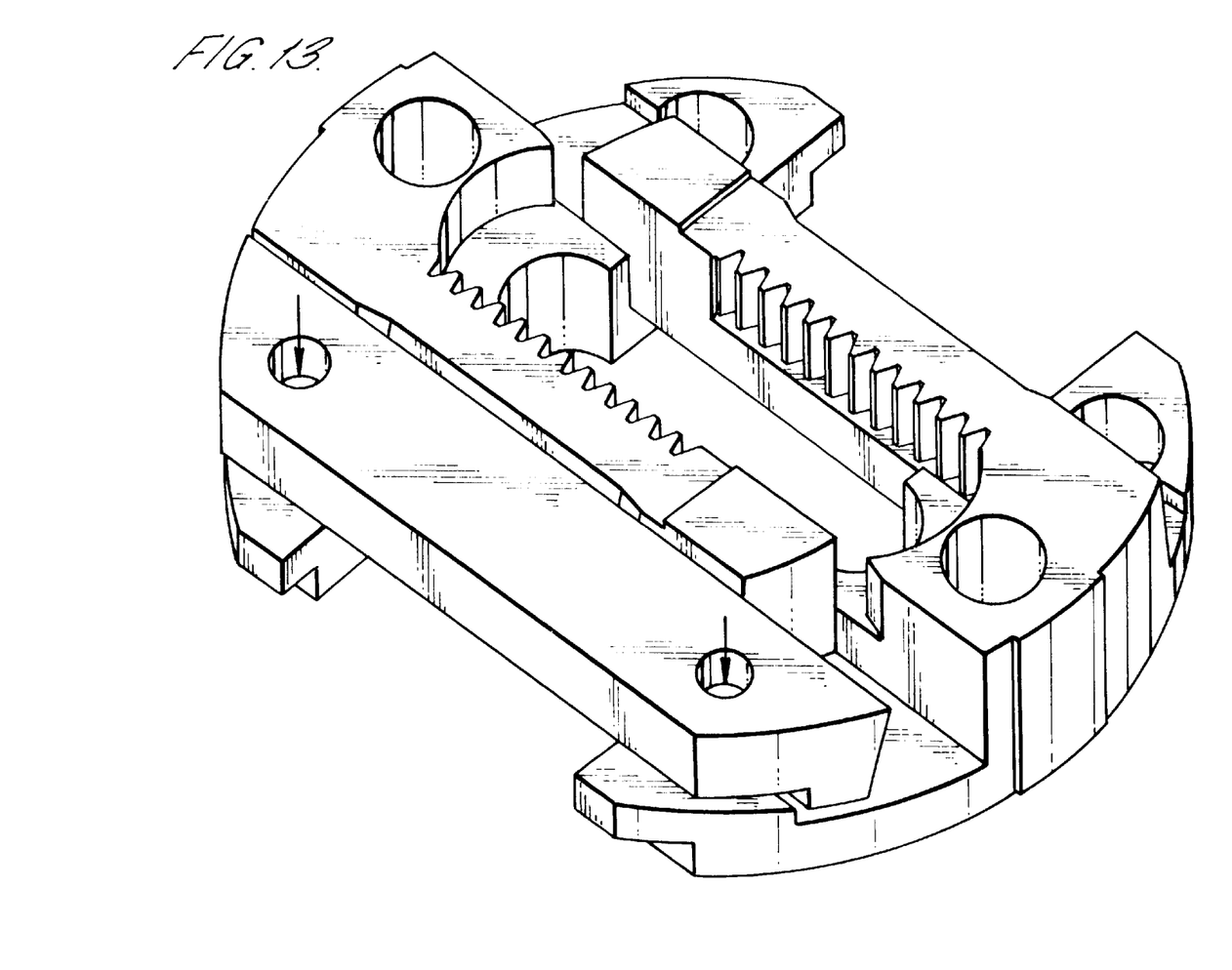
FIG. 13 is a similar view to that of FIG. 11 illustrating the direction of a spring force on one of the carriers to minimise backlash in the arrangement.

Rotation of the shaft 13 by the knob 16 adjusts the spacing of the carriers 32 through the racks 44 between maximum and minimum separation positions as shown in FIGS. 12 and 13.

In order to remove play between the carriers the carriers are pressed together by a spring loaded strip 50 having an inclined face on one side which bears against a corresponding inclined face on an outer side of a leg of one carrier. The other side of the strip bears against the adjacent inside wall of the chassis.

The leg of the other carrier member also has an inclined face which bears against an adjacent inclined face on the chassis. The action of the spring loaded strip is to hold the carrier members together to eliminate any play or backlash. The sprung strip 50 has bores indicated by arrows on FIG. 13 to receive spring loaded screw adjustors (51, 52) mounted on the base plate of the housing 1 to engage the strip 50. The spring pressure can be adjusted to take up any wear in the carrier members by adjusting the screw adjusters 52.

It will be appreciated that many modifications may be made to the above described embodiment without departing from the scope of the invention. For example, the control rotor of the device could be held stationary and the stator rotated with respect to it. Such an arrangement could be utilised for controlling pan movement of the camera mounting and could be provided with a bevel gear drive for the control knob of the mechanism so that the knobs for controlling both pan and tilt can be arranged side by side one another on the camera mounting.

Furthermore, the drag characteristics of the running surfaces of the annular plates and/or segmental plates may be modified in the boundary lubrication mode by surface treatments/coatings applied to the surfaces. For example the surfaces may be coated with a dry lubricant such as polytetrafluoroethylene (P.T.F.E.).

Preferably the cavity of the rotary drag device is sealed off from atmosphere to prevent loss of viscous fluid from the device. However a sealed drag unit which is not completely filled with fluid could suffer from a loss of drag output due to the presence of air bubbles between the adjacent plates, reducing the effective working area of the overlapping plates.

A means of overcoming this problem is to immerse the drag plates in a sealed volume of viscous fluid, initially evacuated to ensure that no air is present. However a sealed unit of this nature requires a means for accommodating the change in volume of the viscous fluid with changes in temperature.

In one specific arrangement according to the invention, the means for accommodating changes in temperature in the viscous fluid comprises a thin-walled bladder immersed in the viscous fluid and vented at one or more places to atmosphere outside the drag unit. The bladder is flexible enough to change volume without storing enough energy to cause a significant change in pressure in the viscous fluid.

Figure 14:
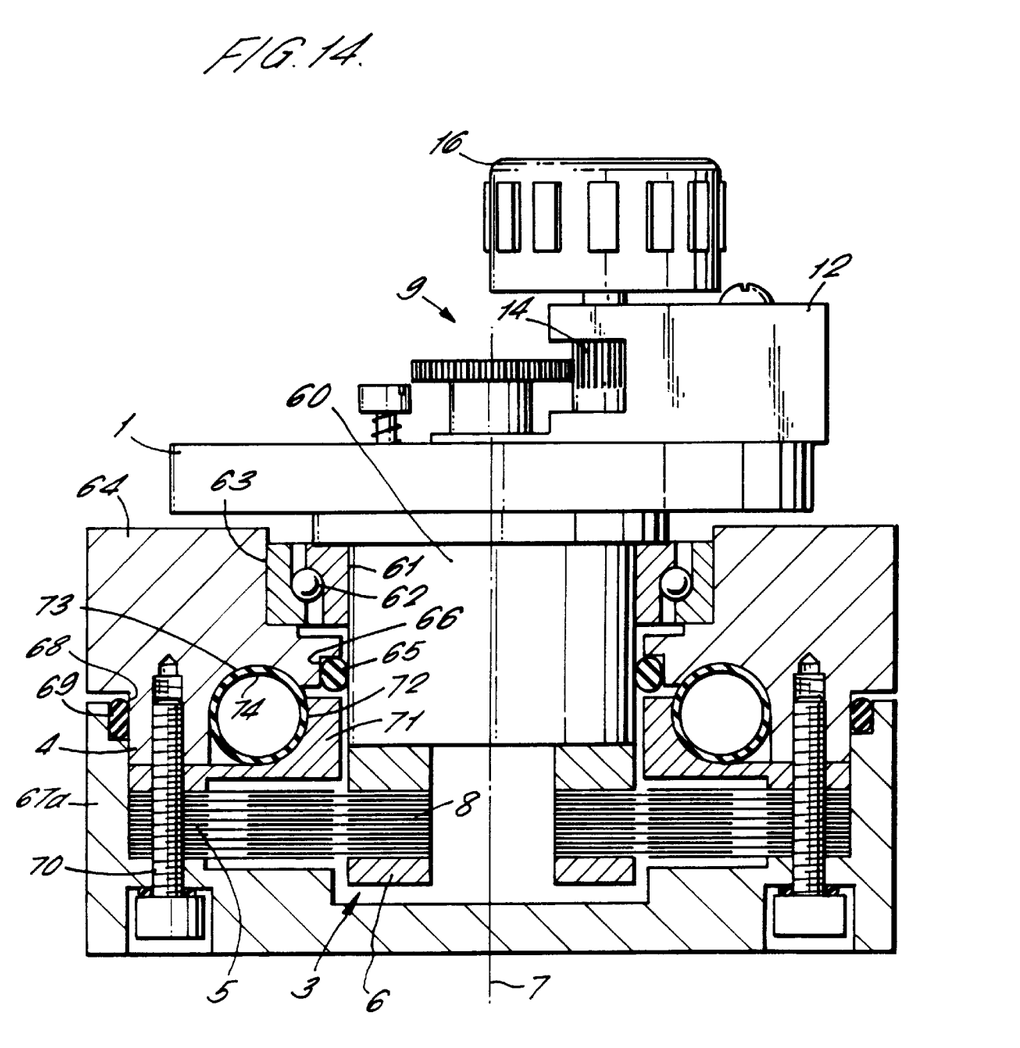
FIGS. 14 and 15 show a modified form of the device of FIG. 1.

Referring to FIG. 14, there is shown a sealed version of the rotary drag device of FIG. 1 and provided with a thin-walled bladder to accommodate changes in the viscous fluid temperature. The base plate 1 of the device has a central circular boss 60 on which the rotor 6 is mounted. The boss has an encircling seat 61 on which an inner race of a radial bearing 62 is supported and an outer race for the bearing is mounted in a seat 63 formed in an extension 64 of the stator 4. A dynamic seal 65 is mounted in a seat 66 in the stator 4 adjacent bearing 62 to seal with the boss 60 and thereby close off the cavity containing the viscous fluid coupling to atmosphere to prevent loss of fluid.

The stator 4 is formed in two parts as before but in this arrangement the stator end cap 67 has an encircling integral sleeve 67a which engages in a recess 68 in the outer side of the stator ring 4 with a static seal 69 mounted between the sleeve and ring to prevent loss of fluid between them. The end cap is secured to the ring by bolts 70 as before but in this case the bolts pass through and secure the stack of annular plates 5 between the end cap and ring.

The bolts also secure an annular plate 71 in the enclosure of the device. One side of the plate and on opposite face of the stator ring 68 are formed with part circular cross-section recesses 72, 73 respectively to receive between them an annular thin-walled bladder 74 which is vented through a port or ports to atmosphere.

Figure 15:
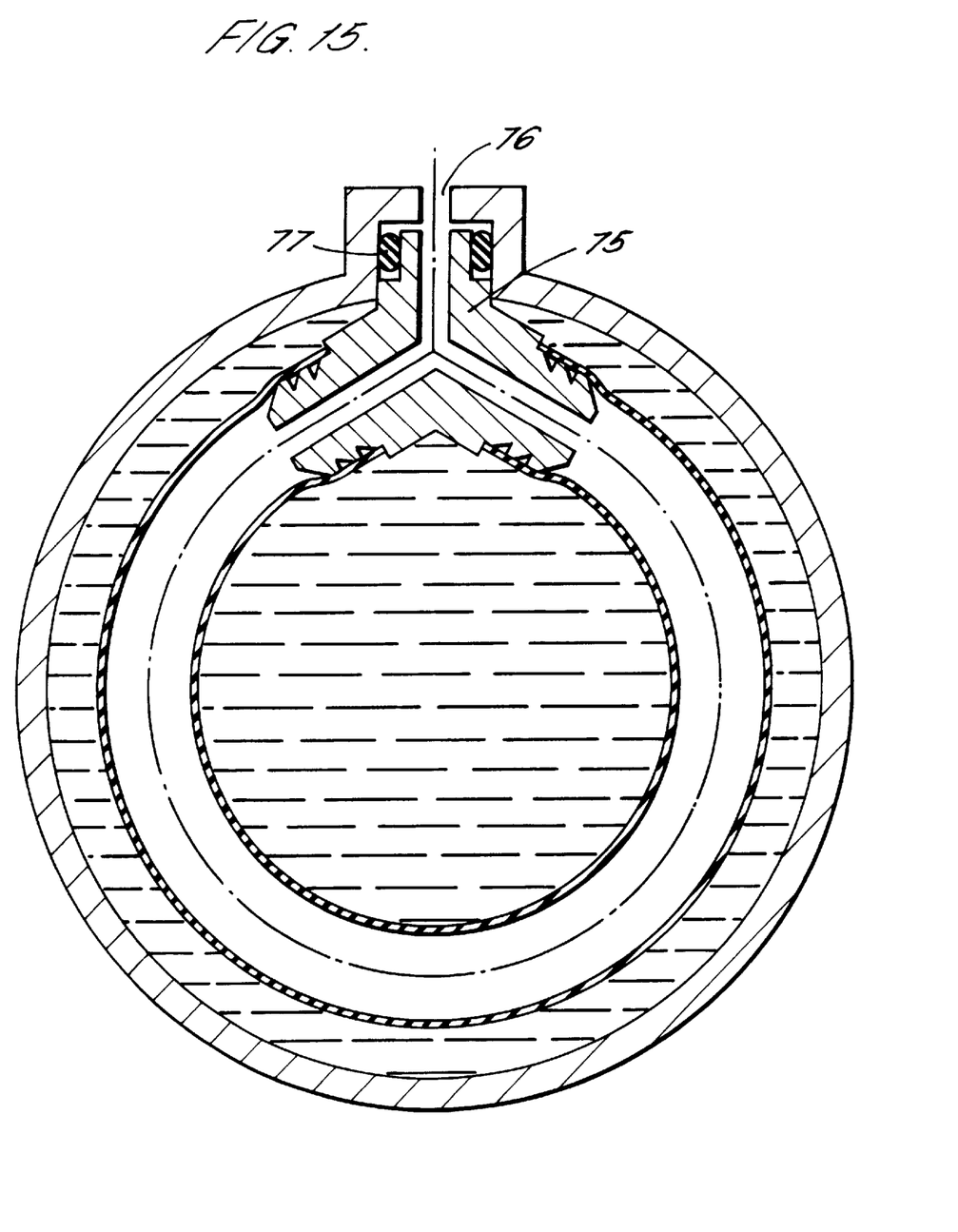

In the arrangement shown in FIG. 15, the bladder takes the form of a thin-walled tube connected to a T-piece 75, the T-piece being vented to atmosphere through a port hole 76 in the wall of the stator sealing ring 77 prevents the viscous fluid entering the T-piece and bladder.

What is claimed is:

1. A rotary drag device having first and second members rotatable with respect to one another, the first member having a plurality of closely spaced, thin-walled flexible annular plates peripherally mounted thereon forming annular first running faces and a viscous fluid filling the spaces between the annular plates, the second member having a plurality of segmental elements forming part-annular second running faces interleaved with the annular plates to slide between the annular plates upon relative rotation between the first and second members, further comprising fluid release means permitting a release of viscous fluid from between the annular plates as a fluid pressure rises ahead of the segmental elements as a relative speed between the first and second members increases, wherein, when the relative speed between the first and second members is below a predetermined speed, the rotary drag device operates in a viscous coupling mode where a drag force rises proportionally with increasing speed up to the predetermined speed and where the annular plates flex to allow the annular plates to approach one another accommodating for a loss of viscous fluid from between the first and second running faces via the fluid release means and, when the relative speed is at least the predetermined speed, the rotary drag device operates in a boundary lubrication mode where the drag force is substantially constant with increasing speed over the predetermined speed and where a reduced amount of viscous fluid remaining between the annular plates provides boundary lubrication between the first and second running faces.

2. A rotary drag device as claimed in claim 1, wherein the fluid release means includes apertures in the annular plates outside the first running faces permitting the viscous fluid to flow axially between the annular plates.

3. A rotary drag device as claimed in claim 2, wherein the apertures comprise elongate arcuate slits spaced around the annular plates outside the first running faces.

4. A rotary drag device as claimed in claim 3, wherein the elongate arcuate slits comprise an inner set and an outer set of arcuate slits, the inner arcuate slits being staggered with respect to the outer slits to provide flexible first beam elements between respective ends of the inner and outer slits to allow portions of the annular plates forming the first running face to move axially with respect to peripheral mounting portions thereof without relative rotation whereby a spacing between the first running faces can vary with a change in the amount of viscous fluid between the annular plates.

5. A rotary drag device as claimed in claim 1, wherein the segmental elements have means permitting limited axial movement of the second running faces to accommodate axial movement of the first running faces.

6. A rotary drag device as claimed in claim 5, wherein the means permitting axial movement includes a row of inner annular slits and a row of outer annular slits outside the second running faces with the outer slits staggered with respect to the inner slits to provide second beam elements between respective ends of the inner and outer slits, the second beam elements flexing to allow limited axial movement of the second running laces with respect to mountings thereof.

7. A rotary drag device as claimed in claim 1, wherein the annular plates are mounted on the first member around outer peripheral edges thereof and the segmental plates are mounted on the second member within the annular plates.

8. A rotary drag device as claimed in claim 1, further comprising overlap adjusting means for adjusting an overlap between the second running faces and the annular plates to vary a degree of drag provided.

9. A rotary drag device as claimed in claim 8, wherein the segmental elements are mounted in pairs and each pair of segmental elements is engaged between two adjacent annular plates.

10. A rotary drag device as claimed in claim 9, wherein the overlap adjusting means includes means for adjusting a spacing between the segmental elements of each pair.

11. A rotary drag device as claimed in claim 10, wherein the second member comprises a hub having a central axis co-axial with an axis of the annular plates and a pair of segmental element carriers slidably mounted on the hub for movement towards and away from the central axis, the pairs of segmental elements being mounted on outer sides of the element carriers and a space adjusting drive mechanism for adjusting a spacing of the element carriers, the space adjusting drive mechanism thereby adjusting the overlap of the first and second running faces.

12. A rotary drag device as claimed in claim 11, the space adjusting drive mechanism comprises a plurality of parallel elongate toothed rack members, each rack member extending from a respective element carrier across the hub and a rotatable pinion drive engaging the rack members to adjust their respective positions.

13. A rotary drag device as claimed in claim 12, further comprising anti-backlash means for taking out play backlash between the rack members and the element carriers.

14. A rotary drag device as claimed in claim 13, wherein the anti-backlash means comprises a spring loaded clamping arrangement acting between the hub and one of the rack members for holding the rack members together through the hub.

15. A rotary drag device as claimed in claim 1, wherein at least one of the first and second running faces have one of surface treatments and coatings to modify drag coefficients thereof when the viscous fluid provides boundary lubrication between the first and second running faces.

16. A rotary drag device as claimed in claim 15, wherein the at least one of the first and second running faces have a P.T.F.E. coating.

17. A rotary drag device as claimed in claim 1, further comprising sealing means between the first and second members to seal off a space containing the annular plates and the segmental elements to prevent loss of viscous fluid, wherein a flexible walled bladder is mounted in the space and is vented to atmosphere to accommodate expansion and contraction of the viscous fluid with change in temperature.

* * * * *

UNITED STATES PATENT AND TRADEMARK OFFICE
CERTIFICATE OF CORRECTION

| | | |
|---|---|---|
| PATENT NO. | : 6,176,783 B1 | Page 1 of 1 |
| DATED | : January 23, 2001 | |
| INVENTOR(S) | : Lindsay et al. | |

It is certified that error appears in the above-identified patent and that said Letters Patent is hereby corrected as shown below:

Abstract,
Delete reference numerals (4) (5) (20) (6) (8) (33) (26, 27);

Column 1,
Line 49, delete "is";

Column 3,
Line 21, change "meas" to -- means --;
Line 44, change "racks" to -- rack --;

Column 5,
Line 4, delete "and"; and

Column 8,
Line 8, change "laces" to -- faces --.

Signed and Sealed this

Twenty-first Day of August, 2001

*Attest:*

*Attesting Officer*

NICHOLAS P. GODICI
*Acting Director of the United States Patent and Trademark Office*